Figure 1:
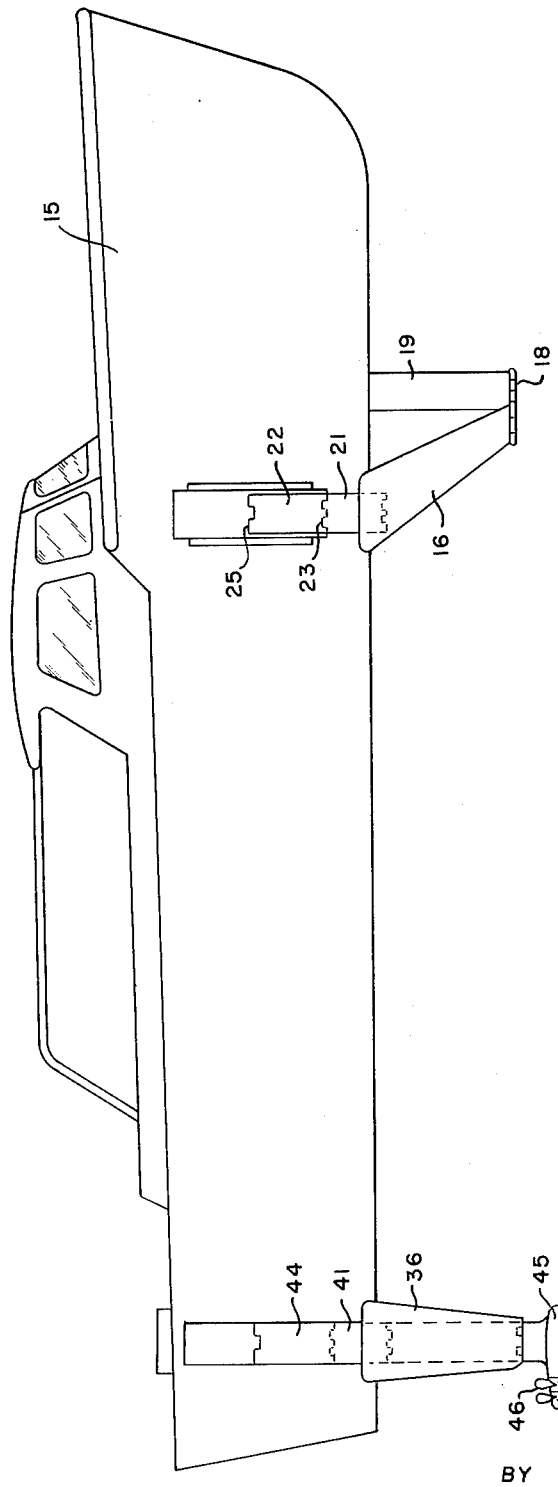

May 16, 1961 J. BADER 2,984,197
ARRANGEMENT FOR HYDROFOIL RETRACTION AND TRANSMISSION
Filed Aug. 19, 1959 7 Sheets-Sheet 1

INVENTOR
JOHN BADER

BY
ATTORNEYS

May 16, 1961 J. BADER 2,984,197
ARRANGEMENT FOR HYDROFOIL RETRACTION AND TRANSMISSION
Filed Aug. 19, 1959 7 Sheets-Sheet 3

INVENTOR
JOHN BADER

BY

ATTORNEYS

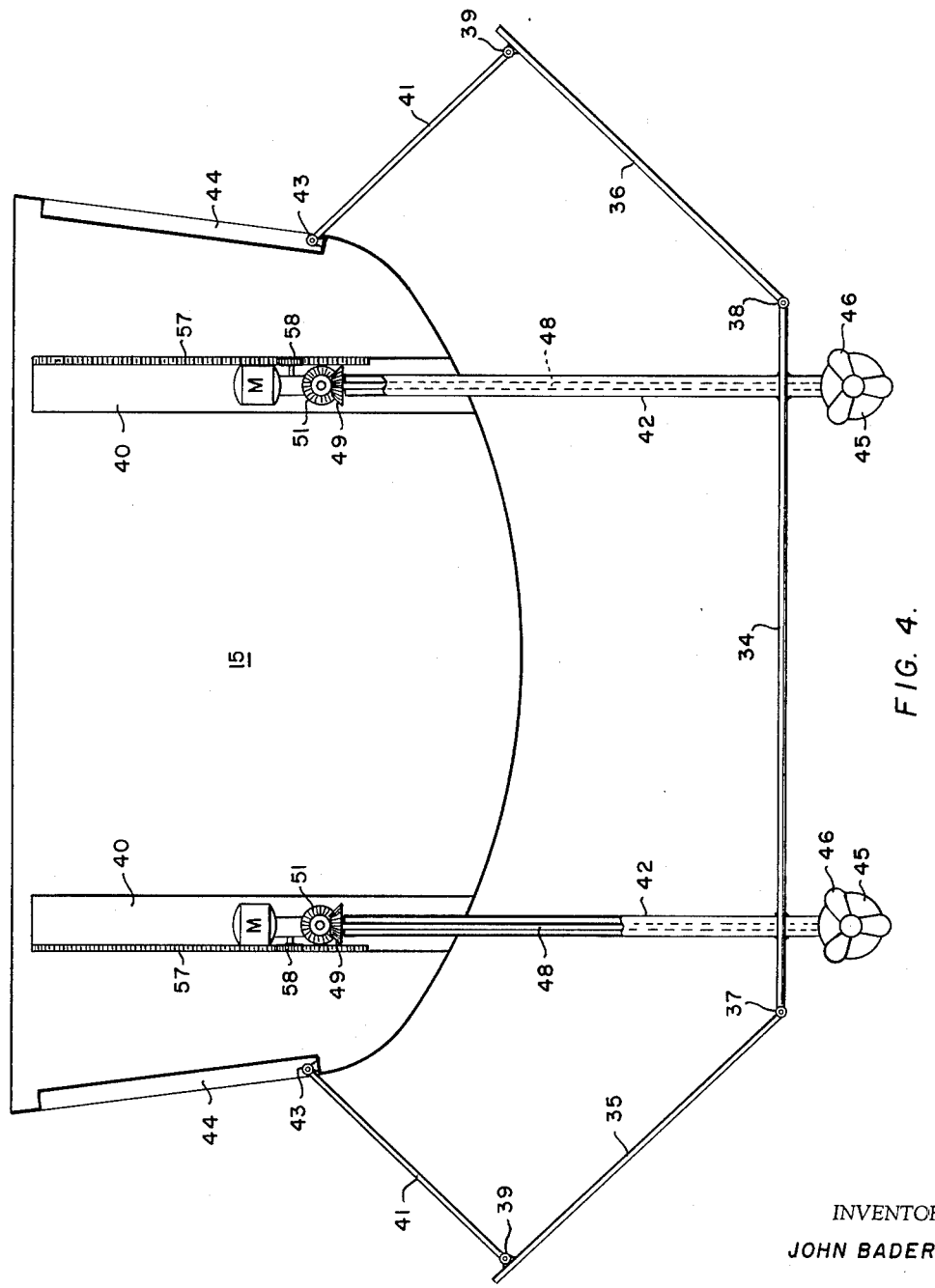

INVENTOR
JOHN BADER

INVENTOR
JOHN BADER

May 16, 1961  J. BADER  2,984,197
ARRANGEMENT FOR HYDROFOIL RETRACTION AND TRANSMISSION
Filed Aug. 19, 1959  7 Sheets-Sheet 7

INVENTOR
JOHN BADER
BY
ATTORNEYS

United States Patent Office 2,984,197
Patented May 16, 1961

2,984,197
ARRANGEMENT FOR HYDROFOIL RETRACTION AND TRANSMISSION

John Bader, Washington, D.C.
(1835 Crandall Drive, San Diego 11, Calif.)

Filed Aug. 19, 1959, Ser. No. 834,899
9 Claims. (Cl. 114—66.5)
(Granted under Title 35, U.S. Code (1952), sec. 266)

The invention described herein may be manufactured and used by or for the Government of the United States of America for governmental purposes without the payment of any royalties thereon or therefor.

The present invention relates to an arrangement for hydrofoil retraction and transmission and more particularly to an arrangement for hydrofoil retraction and transmission wherein the hydrofoils may be retracted close to the sides of the boat and the aft hydrofoil struts incorporate transmission features.

Hydrofoils of various types have been used on boats for many years to allow the craft to "fly" through the water at greater speeds than would be possible with normal displacement craft. Most hydrofoils are fixed in an operating position thereby increasing the draft of the boat at low speeds and generally project beyond the sides of the boat making the boat cumbersome and causing difficulty in docking and maneuvering alongside other boats. Boats with pivots on opposite sides of the boat for partially retracting hydrofoils are known, however the foils still project beyond the sides of the boat. This partial retraction results therefore in a small decrease in boat draft and a large decrease in the handling qualities of the boat.

On known hydrofoil craft the propellers are either fixed in position below the hull or have a pivotable propeller housing with a pantograph type shaft linkage for retractability, which has considerable power loss.

The present invention provides hydrofoils which extend from one side of the boat to the other and which can be completely retracted so the foils do not interfere with the operation of the boat alongside other objects. This system is designed to insure optimum performance in all types of weather.

Power transmission is accomplished in the present invention by means of a transmission system incorporated in the struts supporting the aft hydrofoil when the hydrofoils are in operative position. Power is supplied by a conventional system and propellers when the hydrofoils are retracted. The use of such a principle allows maximum efficiency in either position, makes the transmission system simple, and eliminates the extra gearing otherwise necessary. Since the hydrofoils have only one operative position, lift variations being supplied by flaps, power transmission at intermediate positions is unnecessary.

An object of the present invention is the provision of a device for retraction of hydrofoils which extend from one side of the boat to the other.

Another object is to provide means for raising the vertical struts supporting the hydrofoil.

A further object is the provision of transmission means incorporated in a vertical retractable strut.

Figure 2:
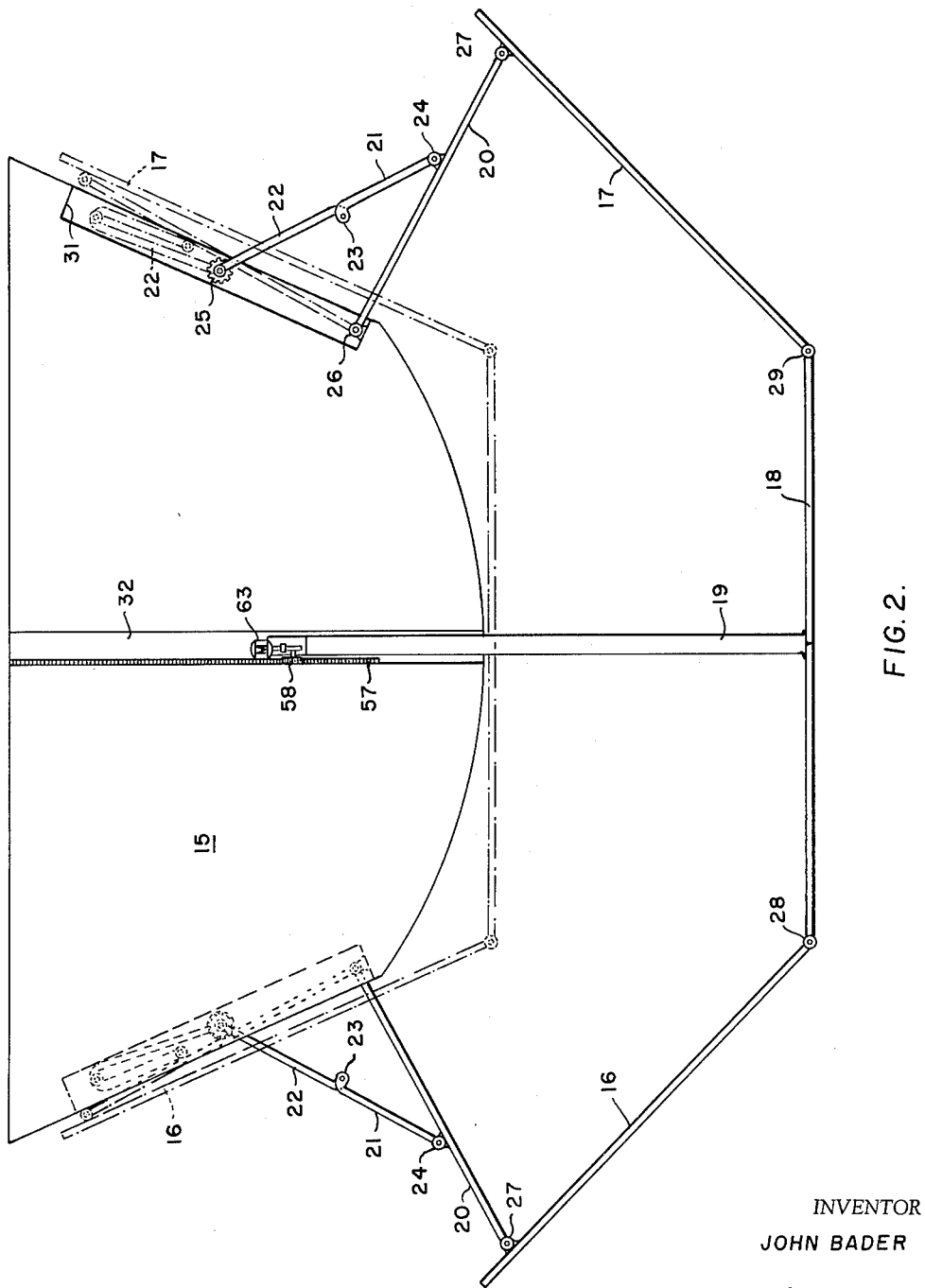
Figure 3:
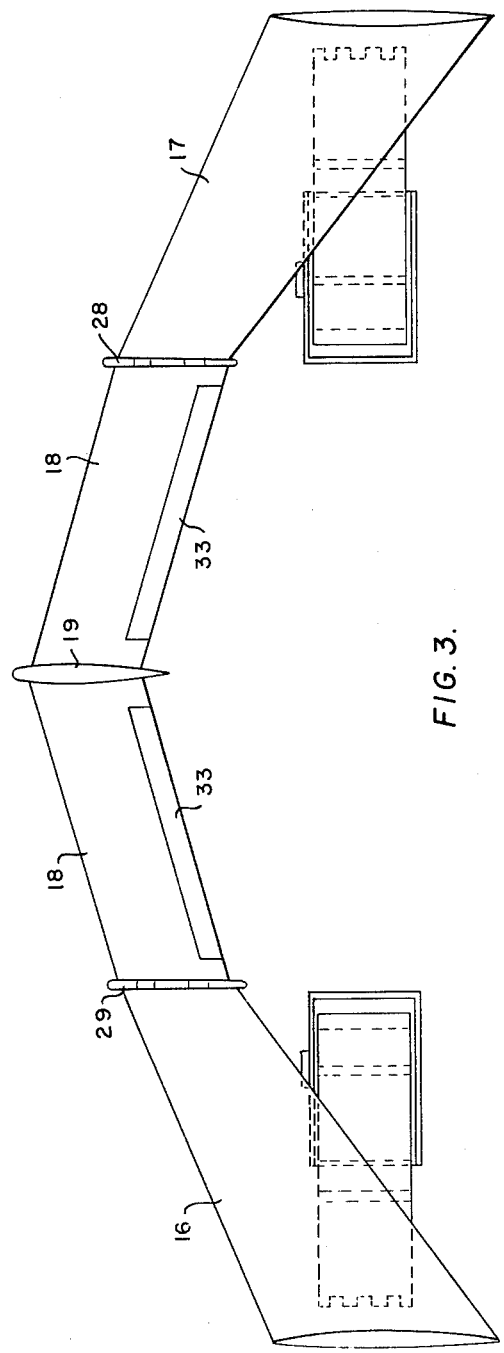
Figure 5:
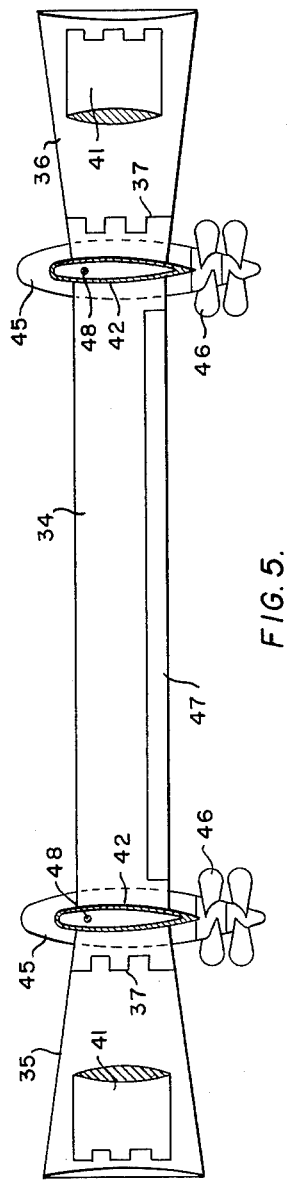
Figure 6:
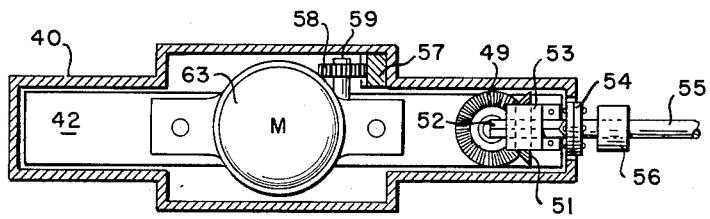
Figure 7:
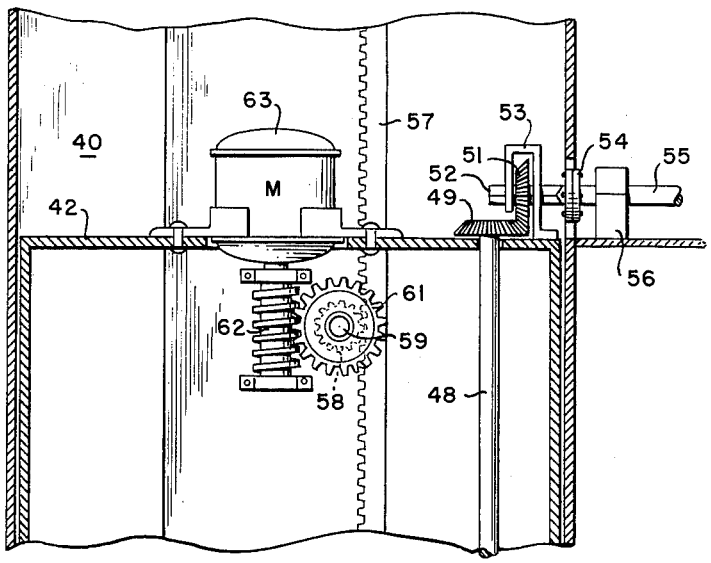
Figure 9:
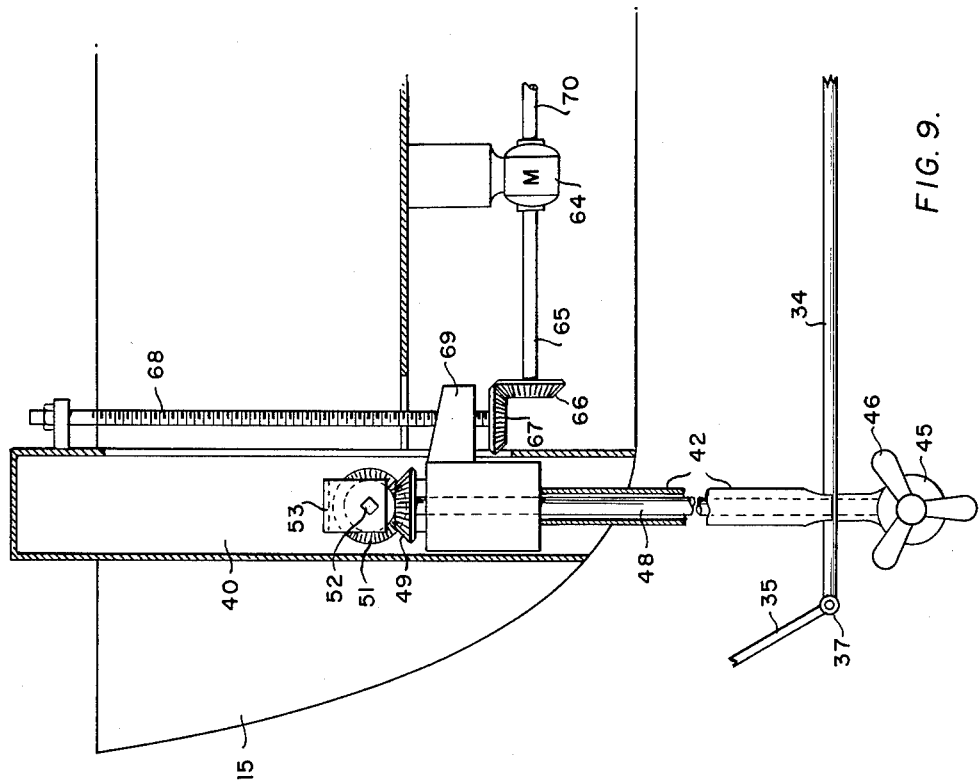
Figure 8:
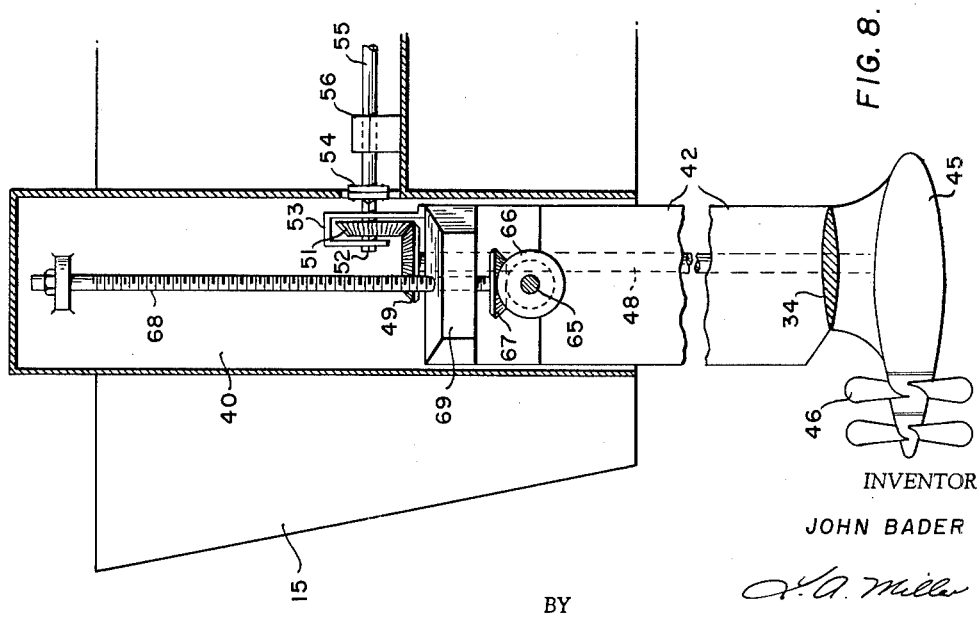
Figure 10:
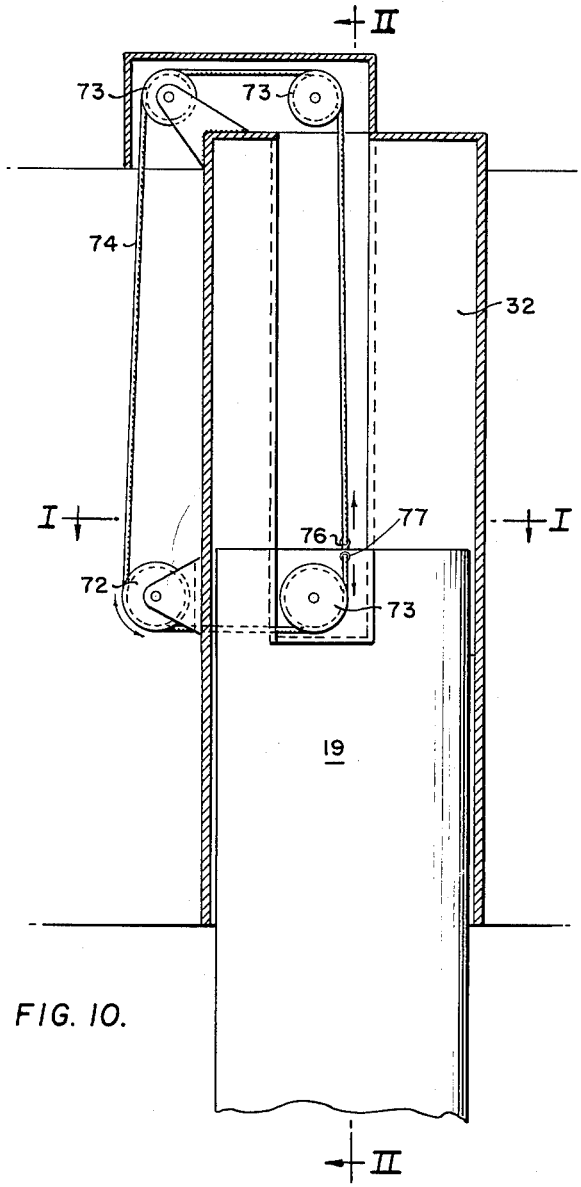
Figure 12:
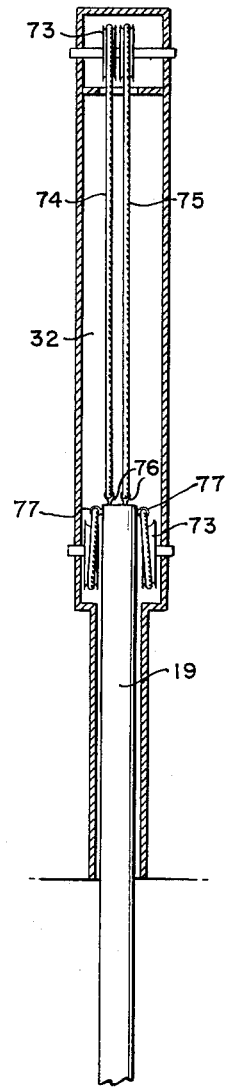
Figure 11:
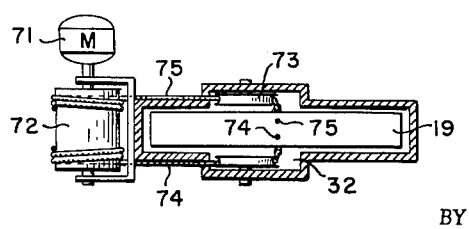

The invention, together with the above and other objects and advantages, is set forth in more technical detail in the following description and accompanying drawing in which like reference characters designate like parts throughout the several views and wherein:

Fig. 1 is a side elevational view of a boat utilizing hydrofoils in accordance with the present invention;
Fig. 2 is a transverse sectional view of the forward hydrofoil shown in Fig. 1;
Fig. 3 is a plan view of the forward hydrofoil;
Fig. 4 is a transverse sectional view of the aft hydrofoil shown in Fig. 1;
Fig. 5 is a plan view of the aft hydrofoil;
Fig. 6 is a top detail view of a strut supporting the aft hydrofoil and showing details of the retraction system and transmission system;
Fig. 7 is a fragmentary side elevational view of the strut supporting the aft hydrofoil as shown in Fig. 6;
Fig. 8 is a side elevational view of the power transmission system and an alternative embodiment of the retraction device;
Fig. 9 is a rear elevational view of the embodiment shown in Fig. 8;
Fig. 10 is a side elevational view of another alternative embodiment of the retraction mechanism.
Fig. 11 is a sectional view of the retraction mechanism taken on the line I—I of Fig. 10; and
Fig. 12 is a sectional view of the retraction mechanism taken on the line II—II of Fig. 10.

Referring now to the drawings, wherein like reference characters designate like or corresponding parts throughout the several views, there is shown in Fig. 1, which illustrates a preferred embodiment, a hull 15, to which hydrofoils 16, 17, 18 (Fig. 2) and 34, 35, 36 (Fig. 4) are attached.

Since the connecting structure is identical on both sides of the hull, one being a mirror of the other, only one side is shown in detail throughout the drawings.

Referring particularly to Figs. 2 and 3, there are shown details of the forward hydrofoil. Lower hydrofoil member 18 is connected to wing members 16 and 17 by means of hinges 28 and 29 and is supported by vertical strut 19 which is slidably mounted in recess 32 of the hull 15.

Wings 16 and 17 are connected to links 20 by means of hinges 27 and links 20 are pivotably mounted on hull 15 in recesses 31 by means of hinges 26. Also attached to links 20 are hinged links 21 and 22 connected together by hinge 23 and to link 20 by hinge 24. The free end of link 22 is connected to the hull 15 and a gear 25. Gear 25 is connected to a suitable power source (not shown) such as an electric or hydraulic motor or the like for folding the links in retraction as will later be described.

Flaps 33 (Fig. 3) are provided on the forward hydrofoil for varying the lift of the foil. The control system for the flaps is conventional and is therefore not shown.

Referring now to Figs. 4 and 5, the after hydrofoil has a bottom foil 34 with a single flap 47 on the after portion thereof. The two ends of the bottom foil 34 are connected by hinges 37 and 38 to wing portions 35 and 36 which in turn are connected to pivot links 41 mounted in recesses 44 of the hull on hinges 43.

Bottom foil 34 is supported by two sliding struts 42 which also carry flying propellers 46 mounted on propeller housings 45. A propeller shaft 48, attached to a bevel gear 49, passes through sliding strut 42 along the vertical axis thereof.

Referring now to Figs. 6 and 7, there are shown details of a preferred embodiment of the strut retracting mechanism and power transmission system. Although the strut retracting mechanism is shown with reference to a rear strut 42 (Fig. 4) it is to be understood that the same system is employed to raise and lower forward strut 19 (Fig. 2).

The power transmission for the flying propellers is transmitted to propeller shaft 48 through bevel gear 49, which is in operative engagement with bevel gear 51 splined on shaft 52. For retraction, bolted coupling 54 is manually disconnected and shaft 52 is pushed into the strut through bearing 53 and bevel gear 51 just far enough so that it clears the strut well. Shaft 55, which is connected to half the bolted coupling is also connected through bearing 56 to a conventional power source, not shown.

For retraction, a motor 63 is mounted on the top surface of strut 42 and is carried thereby. On the shaft of motor 63 is a worm 62 which drives a pinion drive gear 61 mounted on the shaft 59. Shaft 59 also carries a pinion gear 58 which engages a rack 57 mounted on the inner wall of strut well 40.

Thus to retract the foils, bolted couplings 54 are opened at each of the after struts 42. Shafts 52 are pushed partially through bevel gears 51 by means of the splined connection and into strut wells 40 far enough to clear the well walls. Driving power is now supplied by conventional displacement propellers, not shown, mounted on the hull 15. Motors 63 are energized at all vertical struts thereby moving the struts upward on racks 57 in the strut wells 32 and 40.

As the rear struts move upward, hydrofoil 34, 35, and 36 is carried with them and links 41 pivot upward around hinges 43. When the hydrofoil reaches its uppermost position against the hull bottom, links 41 are substantially in recesses 44 and wing members 35 and 36 are substantially flat against the side of the hull, thus presenting no obstruction to close maneuvering. If desired, suitable detent means may be provided to hold the wing members 35 and 36 against the sides of the boat and shallow recesses may be provided for the hydrofoil wing members in the sides of the hull.

As the front vertical strut moves upward under power of the motor 63, gear 25 fixed to the link 22 is rotated by its power source, causing links 21 and 22 to fold at hinge 23 and link 20 to pivot upwardly around hinge 26. Again when the bottom foil 18 is raised to a point in contact with the bottom of the hull, wings 16 and 17 will be in against the side of the hull or in shallow recesses which may be provided and may, if desired, be secured in that position by suitable detent means, not shown.

In place of the gear arrangement 25 shown for pivoting link 22 there may be provided a hydaulic piston or the like which is controlled in a conventional manner to cause folding of links 21 and 22 at hinge 23.

Figs. 8 and 9 show an alternative embodiment for retracting or lowering the hydrofoils. Although this embodiment is again shown with reference to the after struts, it should be realized that a like arrangement would be used with the forward strut or alternatively one type of system could be used at the after strut and another at the forward strut. The driving transmission arrangement shown in Figs. 8 and 9 is identical to that described with reference to Figs. 6 and 7.

The retraction system of Figs. 8 and 9 includes a nut 69 secured to the sliding strut 42. The threads of the nut 69 engage a worm 68 which is secured to the wall of strut well 40. A bevel gear 67 on worm 68 is in engagement with bevel gear 66 which is secured to shaft 65 of a motor 64. When the motor 64 is energized, worm 68 is rotated causing nut 69 and therefore strut 42 to travel up or down as the case may be. If desired, an extension 70 of motor shaft 65 may be utilized to supply power for a similar retracting system on the other struts, or alternatively separate motors may be utilized.

A further embodiment of the retracting mechanism is shown in Figs. 10, 11, and 12 wherein the top of a vertical strut 19 is provided with eyes 76 to which are attached cables 74 and 75 which are passed around winch 72 and sheaves 73, mounted on the inside of strut well 32. The opposite ends of cables 74 and 75 are affixed to eyes 77 located on the sides of vertical strut 19 adjacent sheaves 73.

As winch 72 is driven by motor 71 in either direction, strut 19 will be moved up or down.

It will be realized by anyone skilled in the art that the motors shown in the various embodiments may be either electric or hydraulic. Although motors have been shown, hydraulic cylinders could be utilized in the retraction mechanism without departing from the spirit of the invention. It should also be realized that the foils can be supported by any number of similar vertical sliding struts to permit various sizes of foils as may be required by different size boats. It should be further realized that on the rear foil, the wing members could be omitted.

It should be understood, of course, that the foregoing disclosure relates to only preferred embodiments of the invention and that it is intended to cover all changes and modifications of the examples of the invention herein chosen for the purposes of the disclosure, which do not constitute departures from the spirit and scope of the invention.

What is claimed is:

1. A hydrofoil craft comprising a hull having a forward portion, an after portion, a bottom, and two sides; a pair of longitudinally spaced hydrofoils extending transversely across the bottom of said hull and normally spaced therefrom, first mounting means for positioning one of said hydrofoils on said forward portion of said hull, second mounting means for positioning the other of said hydrofoils on the after portion, each said mounting means comprising at least one rigid vertically retractable strut and a pair of foldable linkages connected to said hydrofoils and the sides of said hull, and means for raising said vertical struts whereby said hydrofoils may be retracted to a position substantially in contact with the bottom and both sides of said hull.

2. A high speed boat as defined in claim 1 and further comprising power transmission means incorporated in the vertical strut of said second mounting means.

3. A high speed boat as defined in claim 2 wherein each of said first and second mounting means include a linkage pivotably connected to recesses in the sides of said hull and means for raising and lowering said retractable vertical strut.

4. A high speed boat as claimed in claim 3 wherein said means for raising and lowering said retractable vertical strut comprises a rack secured to said hull, a motor secured to said vertical strut, and a gear system in operative engagement with said motor and rack adapted to raise or lower said rack when said motor is energized.

5. A high speed boat as claimed in claim 3 wherein said means for raising and lowering said retractable vertical strut comprises a nut secured to said vertical strut, a worm gear in operative engagement with said nut and rotatably mounted in said hull, and power means for driving said worm gear.

6. A high speed boat as defined in claim 3 wherein said means for raising and lowering said retractable vertical strut comprises a cable connected to said vertical strut, a plurality of sheaves over which said cable is adapted to pass and a winch operatively engaging said cable whereby turning of said winch raises or lowers said strut.

7. The invention as defined in claim 2 wherein said power transmission means includes a propeller, a propeller drive shaft substantially parallel to the vertical strut, a first gear fixedly attached to said propeller shaft at the upper extremity thereof, a power drive shaft, a spline shaft detachably connected to said power drive shaft and a second gear in engagement with said first gear and slidably mounted on said spline shaft, whereby upon disconnecting said spline shaft from said power shaft said spline shaft may be moved relative to said second gear to allow retraction of said strut.

8. A hydrofoil craft comprising a hull having a forward portion, an after portion, a bottom, and two sides, a pair of longitudinally spaced hydrofoils extending transversely across the bottom of said hull and normally spaced therefrom, retractable struts at said after portion and said forward portion, each said strut having one end retractably mounted in said hull, means for retracting and lowering said struts; each of said hydrofoils having a transversely extending portion rigidly connected to at least one of said struts and a pair of wing members hingedly connected to said transversely extending portion, and a plurality of foldable linkage systems connected between said wing members and the sides of said hull.

9. The invention as defined in claim 8 wherein each said linkage system comprises a first link having one end hingedly connected to said hull and the other end hingedly connected to said wing member, and a pair of hingedly connected links having one end hingedly connected to said first link at a midportion thereof and having their other end hingedly connected to the side of the hull, and means for folding said pair of hingedly connected links whereby as said strut is retracted, said wing members pivot toward the hull.

References Cited in the file of this patent

UNITED STATES PATENTS

| | | |
|---|---|---|
| 2,073,438 | Adams | Mar. 9, 1937 |
| 2,713,317 | Herz | July 19, 1955 |
| 2,720,180 | Von Schertel | Oct. 11, 1955 |
| 2,749,870 | Vavra | June 12, 1956 |
| 2,749,871 | Scherer et al. | June 12, 1956 |
| 2,767,678 | Vertens | Oct. 23, 1956 |

FOREIGN PATENTS

| | | |
|---|---|---|
| 251,789 | Italy | Feb. 2, 1927 |
| 517,519 | Germany | Feb. 4, 1931 |
| 587,317 | Great Britain | Apr. 22, 1947 |